Nov. 29, 1966 N. LAING 3,288,355
FLUID FLOW MACHINES
Filed May 24, 1965 7 Sheets-Sheet 1

INVENTOR
Nikolaus Laing
BY
Morton, Taylor & Adams
ATTORNEYS

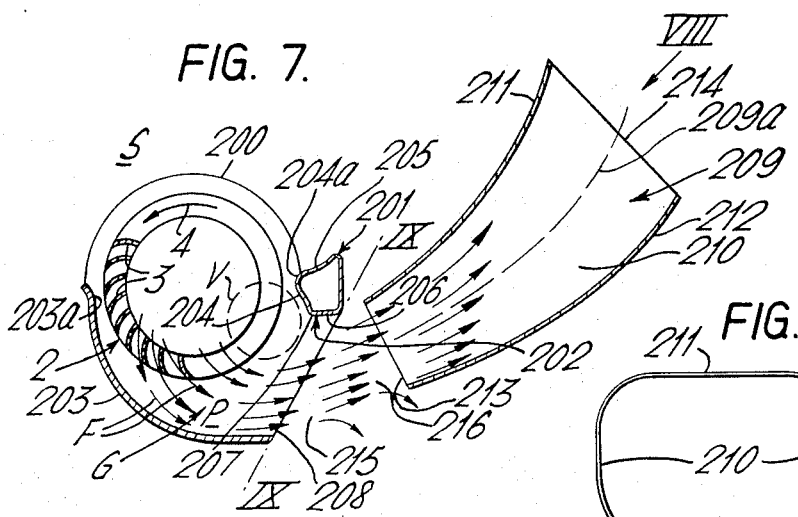
FIG. 7.
FIG. 8.
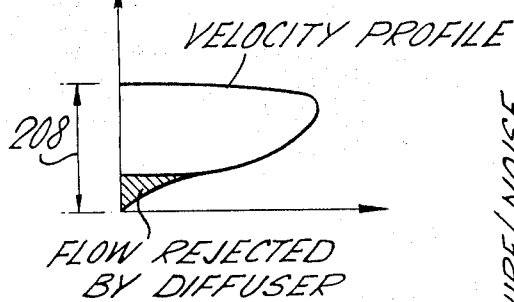
FIG. 9.
VELOCITY PROFILE
FLOW REJECTED BY DIFFUSER
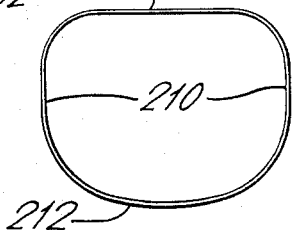
FIG. 13.
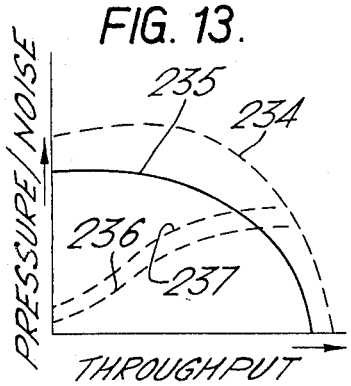
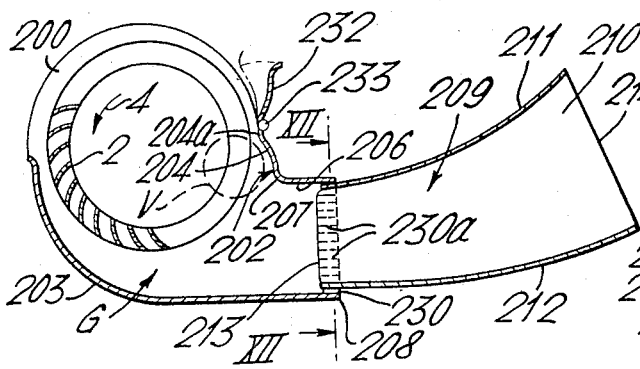
FIG. 11.
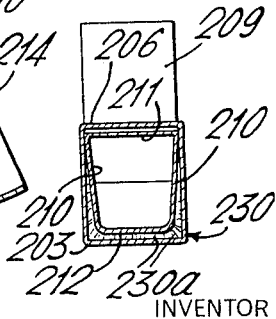
FIG. 12.

Nov. 29, 1966  N. LAING  3,288,355
FLUID FLOW MACHINES
Filed May 24, 1965  7 Sheets-Sheet 4

INVENTOR
Nikolaus Laing
BY
ATTORNEYS

Nov. 29, 1966   N. LAING   3,288,355
FLUID FLOW MACHINES
Filed May 24, 1965   7 Sheets-Sheet 5
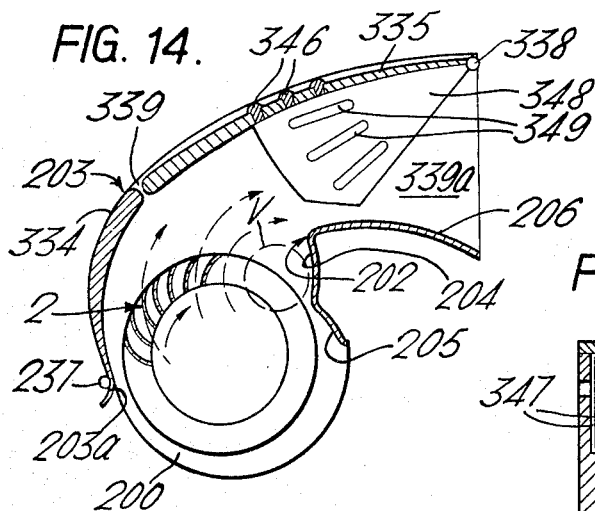
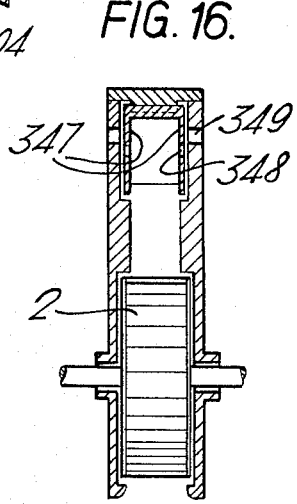
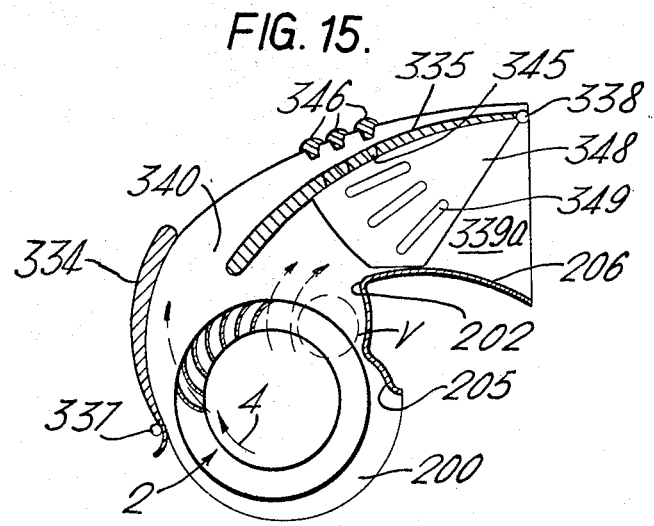
INVENTOR
Nikolaus Laing
BY
ATTORNEYS Nov. 29, 1966  N. LAING  3,288,355
FLUID FLOW MACHINES
Filed May 24, 1965  7 Sheets-Sheet 7

INVENTOR
NIKOLAUS LAING
BY
ATTORNEYS

United States Patent Office 3,288,355
Patented Nov. 29, 1966

3,288,355
FLUID FLOW MACHINES
Nikolaus Laing, 7141 Aldingen Hofener Weg 35,
near Stuttgart, Germany
Filed May 24, 1965, Ser. No. 457,953
Claims priority, application Germany, Dec. 7, 1956,
E 13,335; Dec. 9, 1958, L 31,922
30 Claims. (Cl. 230—125)

This invention relates to machines for inducing movement of fluid, which is understood as including both liquids and gases; this application is a continuation-in-part of copending application Serial No. 221,621, filed September 5, 1962, now U.S. Patent No. 3,232,522, itself a continuation-in-part of application Serial No. 671,114 filed July 5, 1957, now abandoned, and incorporates and claims subject matter disclosed in part in copending application Serial No. 858,217, filed December 8, 1959, now abandoned. The invention more particularly concerns flow machines of the cross-flow type, that is, machines comprising a cylindrical bladed rotor mounted for rotation about its axis in a predetermined direction and defining an interior space, and guide means defining with the rotor a suction region and a pressure region, the guide means and rotor co-operating on rotation of the latter in said predetermined direction to induce a flow of fluid from the suction region through the path of the rotating blades of the rotor to said interior space and thence again through the path of said rotating blades to the pressure region. More especially but not exclusively, the invention concerns flow machines of the cross-flow type wherein the guide means and rotor co-operate to set up a vortex of Rankine character having a core region eccentric of the rotor axis and a field region which guides the fluid so that flow through the rotor is strongly curved about the vortex core: such flow machines will herein be designated "tangential" machines and the characteristics of a preferred form of such a machine will be described in detail later.

The invention is particularly concerned with obtaining static pressure at the outlet of a tangential fan. It is common practice in the flow machine art to use a diffuser for conversion of velocity energy to static pressure energy, and the invention does indeed propose to utilize a diffuser to receive fluid flow in the pressure region, for this purpose. However the invention aims to obtain improved static pressure as compared to that obtainable simply by forming the guide means as a diffuser to receive all the throughput of the rotor.

The basic concept of the invention is that improved static pressure can be obtained by arranging the diffuser to receive only that part of the flow in the vortex field region which lies adjacent the vortex core and to reject flow from the field region remote from the vortex core. This apparent paradox is founded on the experimental observation that flow tubes adjacent the vortex core are markedly faster than flow tubes remote therefrom: the invention collects only high energy flow tubes, from which good static pressure can be had, and rejects the remainder of the flow, which has little energy and when collected in the same diffuser has been found to reduce efficiency of conversion from velocity to pressure energy, by reason of mixing losses. It has been found that static pressure can be improved if the low velocity flow is rejected from the diffuser.

Clearly, the proportion of flow collected by the diffuser to flow rejected thereby in a flow machine according to the invention will depend on the requirements of a specific application of the machine. The rejected flow can be collected for some subsidiary use, or allowed to go to waste or recirculated through the rotor, as expedient in a particular application.

One result of having a rotor throughput which is larger than the high pressure output is that stability of operation of the flow machine can be maintained with a high pressure output of restricted volume. By contrast if all the rotor throughput is delivered to a common output it is generally found that instability occurs when the machine is throttled beyond a certain point.

One form of the invention comprises a "tangential" flow machine as above defined wherein the guide means includes a guide body adjacent to which the vortex core forms and wherein a diffuser is provided having a first wall substantially continuous with the guide body, so that the diffuser receives the fast flow adjacent the core, and a second wall with its leading edge dividing flow in the pressure region, and rejecting the slower flow remote from the guide body. In one embodiment this slow flow passes into a separate low pressure diffuser. In another embodiment the second wall is movable to vary the proportion of flow collected in the diffuser.

The invention includes also a "tangential" flow machine wherein the guide means comprises first and second guide walls, and end walls, the first guide wall dividing the pressure region from the suction region going in the direction of rotation, and wherein a diffuser is provided having first and second side walls and end walls and being located to receive fluid from said pressure region with flow adjacent the first guide wall entering the diffuser adjacent the first side wall thereof, the second diffuser side wall and said second guide wall defining a gap for escape from the diffuser of the flow adjacent the second guide wall. This rejected flow may be recirculated through the rotor. The guide means may define an outlet, with the diffuser having its inlet adjacent the outlet with a cross-sectional area less than that of the outlet so that flow adjacent the second guide wall, that is, the slower flow, is rejected. The flow adjacent the end walls will also be relatively slow and by having the diffuser end walls inwardly of the end walls of the guide means this flow also can be eliminated from the diffuser. The diffuser inlet can be spaced from the outlet going in the direction of flow or it can lie within the outlet to define a gap in the form of a substantially rectangular annulus.

The invention also provides a flow machine comprising plurality of stages, each a "tangential" machine as above defined, and a diffuser between each pair of adjacent stages, each diffuser having an inlet located in the pressure region of one stage to receive flow from the field region thereof adjacent the vortex core and to deliver said flow at enhanced pressure to the suction region of the next stage, and means in each stage to circulate to the suction region thereof flow in the pressure region of that stage which is rejected by the diffuser.

Various embodiments of the invention will now be described by way of example with reference to the accompanying somewhat diagrammatic drawings in which:

FIGURE 7 is a cross-sectional view of a further form of tangential flow machine according to the invention having a single diffuser receiving only part of the rotor throughput, the rest being recirculated;

FIGURE 8 is an end view of the diffuser illustrated in FIGURE 7 seen in the direction of the arrow VIII therein;

FIGURE 9 is a graph illustrating velocity at the line IX—IX in the FIGURE 7 flow machine;

FIGURE 11 is a cross-sectional view of another tangential flow machine according to the invention which also recirculates through the rotor part of the throughput thereof, and which includes control means;

FIGURE 12 is a section of the FIGURE 11 machine taken at right angles to the plane of FIGURE 11 along the line XII—XII;

FIGURE 13 is a graph showing characteristic and noise curves of the FIGURE 11 machine for different settings of the control means;

FIGURES 14 and 15 are cross-sectional views of a form of tangential flow machine according to the invention having an adjustable diffuser, and showing two alternative positions thereof;

FIGURE 16 is an axial sectional view of the machine of FIGURES 14 and 15, the diffuser being in the FIGURE 14 position;

Figure 1:
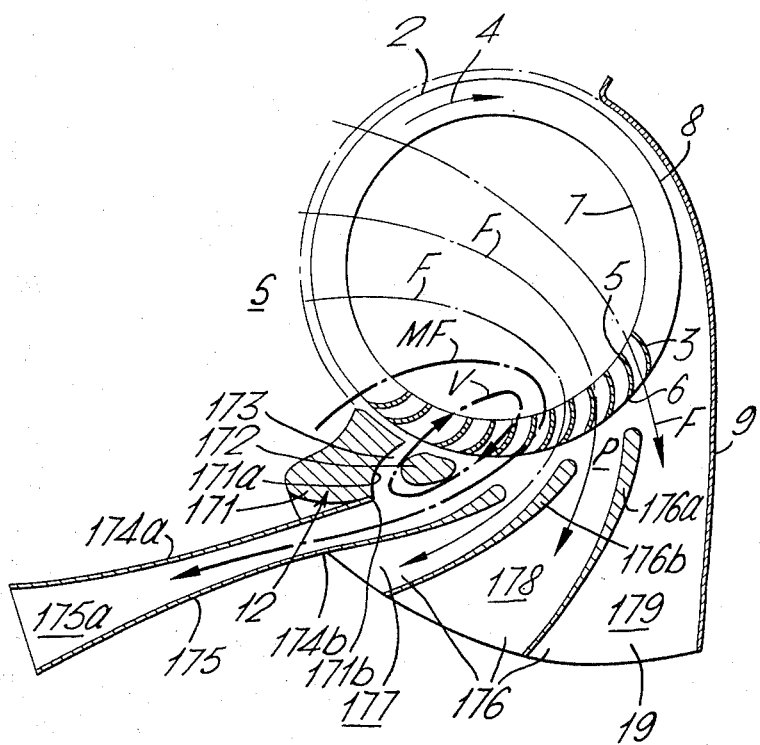
FIGURE 1 is a cross-sectional view of a tangential flow machine according to the invention having a high pressure diffuser and a separate low pressure diffuser.

Referring now to FIGURE 1 of the accompanying drawing, the flow machine there shown comprises a cylindrical blade rotor 2 having thereon a plurality of blades 3 concavely curved in the direction of rotation of the rotor indicated by the arrow 4 wherein the blades 3 have their outer edges 5 leading their inner edges 6. The outer edges define an outer envelope 7 while the inner edges define an inner envelope 8 when the rotor is rotated. The rotor is mounted, by means not shown, whereby it will rotate about its axis. A guide wall 9 extends the length of the rotor. Opposite the guide wall 9 a vortex stabilizing means designated generally 12 also extends the length of the rotor 2 and is positioned exteriorly thereof.

The vortex-forming and stabilizing means 12 has a rounded end 15 which has a portion extending towards the rotor in the direction of rotation to form a converging gap 16 which, as more fully explained hereafter, serves to form and stabilize, a fluide vortex when the motor is rotated. Then guide wall 9 and means 12 serve to separate the suction side S from the pressure side P of the machine and to define an entry and an exit arc to the rotor. End walls 19, only one of which is shown, substantially cover the ends of the machine.

The vortex stabilizing means 12 in the embodiment illustrated comprises a main body 171 and an auxiliary body 172 spaced therefrom both extending the length of the rotor 2 in well-spaced relation thereto and together subtending at the centre thereof a small angle (actually about 20°), the main body subtending only about this angle. The main body 171 presents a concave surface 171a to the pressure side P: the auxiliary body 172 is of rounded cross-section and defines with the surface 171a a return-flow passage 173. A diffuser wall 174a extending the length of the rotor 2 meets the surface 171a remote from the rotor at a nose 171b, wall and surface defining about 90° at the nose. A second diffuser wall 174b extends away from the rotor 2 to the pressure side of the wall 174a, but much closer thereto than to the wall 9, these two walls 174a, 174b diverging from one another and defining a main diffuser 175 adjacent the vortex stabilizing means 12 and leading to a main outlet 175a. The remainder of the pressure side P, between the walls 174b and 9, forms a secondary diffuser 176 which is subdivided by walls 176a and 176b into three diffusing channels 177, 178, 179 having a common outlet 180 separate from the main outlet 175a.

In operation of the machine illustrated in FIGURE 1, a fluid vortex approximating a Rankine type vortex is formed having a core indicated schematically by the line V and positioned eccentrically with respect to the rotor axis interpenetrating the path of the rotating blades 3 of the rotor 2. The whole throughput of the machine will then flow twice through the blade envelope 8 in a direction perpendicular to the rotor axis along curved lines indicated schematically by the flow lines F, MF.

Figure 4:
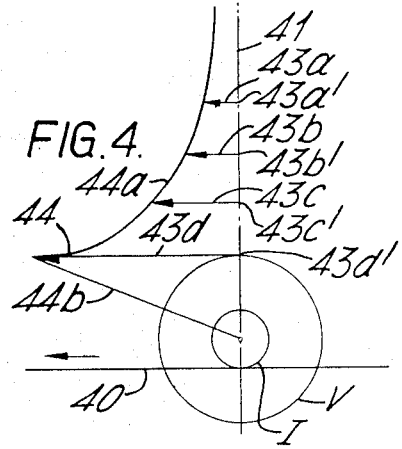
FIGURE 4 is a graph illustrating the velocity of flow within the field and core of a Rankine vortex.

FIGURE 4 illustrates an ideal relation of the vortex to the rotor 2 and the distribution of flow velocity in the vortex and in the field of the vortex. The line 40 represents a part of the inner envelope 6 of the rotor blades 3 projected onto a straight line while the line 41 represents a radius of the rotor taken through the axis of the vortex core V. Velocity of fluid at points on the line 41 by reason of the vortex is indicated by the horizontal lines 43a, 43b, 43c and 43d, the length of these lines being the measure of the velocity at the points $43a^1$, $43b^1$, $43c^1$ and $43d^1$. The envelope of these lines is shown by the curve 44 which has two portions, portion 44a being approximately a rectangular hyperbola and the other portion, 44b, being a straight line. Line 44a relates to the field region of the vortex and the curve 44b to the core. It will be understood that the curve shown in FIGURE 4 represents the velocity of fluid where an ideal or "mathematical" vortex is formed, and that in actual practice, flow conditions will only approximate these curves.

The core of the vortex is a whirling mass of fluid with no translational movement as a whole and the velocity diminishes from the periphery of the core to the axis 42. The core of the vortex intersects the blade envelope as indicated at 40 and an isotach I within the vortex having the same velocity as the inner envelope contacts the envelope. The vortex core V is a region of low pressure and the location of the core in a machine constructed according ot the invention can be determined by measurement of the pressure distribution within the rotor.

The velocity profile of the fluid where it leaves the rotor and passes through the path of the rotating blades will be that of the vortex. In the ideal case of FIGURE 4, this profile will be that of the Rankine vortex there shown by curves 43a and 43b, and in actual practice, the profile will still be substantially that shown in FIGURE 4 so that there will be in the region of the periphery of the core V shown in FIGURE 1 a flow tube MF of high velocity and the velocity profile taken at the exit of the rotor will be similar to that shown in FIGURE 2 where the line FG represents the exit of the rotor and the ordinates represent velocity. The curve shown exhibits a pronounced maximum point C which is much higher than the average velocity represented by the dotted line.

Figure 3:
FIGURE 3 is a graph illustrating velocity at the outlet of a conventional flow machine.

It will be appreciated that much the greater amount of fluid flows in the flow tubes in the region of maximum velocity. It has been found that approximately 80% of the flow is concentrated in the portion of the output represented by the line AE which is less than 30% of the total exit of the rotor. A conventional velocity profile for fluid flow in a defined passage is illustrated by way of contrast in FIGURE 3 where the average velocity of flow is represented by the dotted line. Those skilled in the art regard this profile as being approximately a rectangular profile which following the principle generally adhered to is the sort of profile heretofore sought in the outlet of a flow machine.

Figure 2:
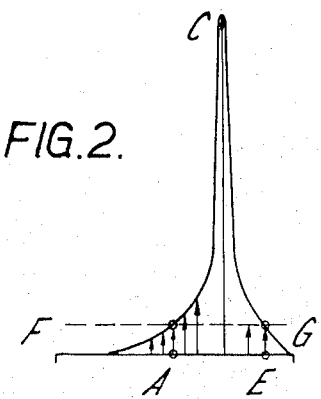
FIGURE 2 is a graph illustrating air velocity at the outlet of a machine such as that of FIGURE 1.

The maximum velocity C shown in FIGURE 2 appertains to the maximum velocity flow tube indicated as MF in FIGURE 1. With a given construction the physical location of the flow tube MF may be closely defined. The relative velocity between the blades and fluid in the restricted zone of the rotor blades 3 through which the flow tube MF passes is much higher than it would be if a flow machine were designed following the conditions adhered to heretofore in the art respecting the desirability of a rectangular velocity profile at the exit arc and even loading of the blades.

Under low Reynolds number conditions, this unevenness of the velocity profile leads to beneficial results in that there will be less separation and energy loss in the restricted zone through which the flow tube MF passes than if that flow tube had the average velocity of throughput taken over the whole exit of the rotor. There is a more efficient transfer of momentum to the fluid by the blades in this restricted zone and while the transfer of momentum in the flow tubes travelling below the average velocity will be less efficient, nevertheless when all of the flow tubes are considered, there is a substantial gain in efficiency.

Figure 5:
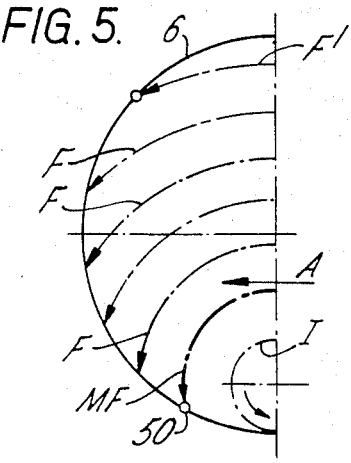
FIGURE 5 illustrates the ideal flow occurring in one half the cross-sectional area of a rotor such as shown in FIGURE 1.

FIGURE 5 illustrates the ideal distribution of flow tubes F occurring within one half the rotor area defined by the inner envelope 6, it being understood that the flow tubes in the other half of the rotor are similar. The maximum velocity flow tube MF is shown intersecting the envelope 6 at point 50 and the isotach I as being circular when the whole rotor is considered. It is seen that ideally the maximum velocity flow tube MF undergoes a change of direction of substantially 180° from the suction to the pressure sides when the flow in the whole rotor is considered. It is also to be noted that the major part of throughput, represented by the flow tube MF, passes through the rotor blades where they have a component of velocity in a direction opposite to the main direction of flow within the rotor indicated by the arrow A.

Figure 6:
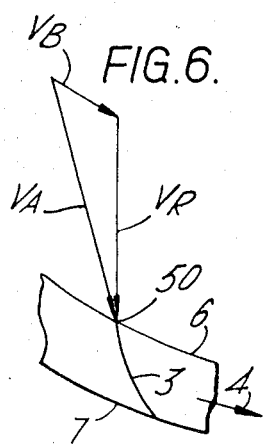
FIGURE 6 is a vector diagram illustrating the flow of air over a blade of the FIGURE 1 rotor from the interior of the rotor to the exit side thereof.

FIGURE 6 is a diagram showing the relative velocities of flow with respect to a blade at the point 50 referred to in FIGURE 5. In this figure $V_B$ represents the velocity of the inner edge of the blade 3 at the point 50, $V_A$ the absolute velocity of the air in the flow tube MF at the point 50, and $V_R$ the velocity of that air relative to the blade as determined by completing the triangle. The direction of the vector $V_R$ coincides with that of the blade at its inner edge so that fluid flows by the blade substantially without shock.

The character of a vortex is considered as being determined largely by the blade angles and curvatures. The position of the vortex, on the other hand, is considered as being largely determined by the configuration of the vortex forming means which forms and stabilizes a vortex in co-operation with the bladed rotor. The particular angles and curatures in any given case depend upon the following parameters: the diameter of the rotor, the depth of a blade in a radial direction, the density and viscosity of the fluid, the disposition of the vortex forming means and the rotational speed of the rotor, as well as the ratio between over-all pressure and back pressure. These parameters must be adapted to correspond to the operating conditions in a given situation. Whether or not the angle and shape of the blades have been fixed at optimum values is to be judged by the criterion that the flow tubes close to the vortex core are to be deflected substantially greater than 90°.

It is to be appreciated that the flow lines of FIGURE 1 do not correspond exactly to the position of the vortex core V as illustrated in FIGURES 4 and 5 which represent the theoretical or mathematical flow. These latter figures show that it is desirable to have the axis of the core of the vortex within the inner blade envelope 6 so that the isotach within the core osculates that envelope. Although this position is achieved in certain constructions hereinafter described, it is not essential, and in fact, is not achieved in the structure shown in FIGURE 1.

It is to be further appreciated that despite the divergence of the flow in FIGURE 1 from the ideal, the maximum velocity flow tube MF with which is associated the major part of the throughput is nevertheless turned through an angle of substantially 180° in passing from the suction to the pressure side of the rotor and that this maximum flow tube passes through the rotor blades where the blades have a velocity with a component opposite to the main direction of flow through the rotor as indicated by the arrow A.

As will be appreciated from the foregoing, the high velocity flow tubes indicated schematically by the line MF are received in the main diffuser 175 adjacent the vortex stabilizing means 12 where their velocity energy is partially transformed to static pressure. The low velocity flow indicated by the lines F passes into the separate subdivided secondary diffuser 176 and thence to the outlet 180. It is to be noticed that so far as the main or high pressure outlet 175a is concerned, the low velocity flow is rejected. In the embodiment described this flow is utilized and fed to a separate outlet 180, for separate utilization. However, the invention contemplates that the low velocity flow may simply be led to waste or re-circulated through the rotor, in which case the walls 9, 176a, 176b may be dispensed with. As already explained it has been found that better static pressure is obtained by rejecting the slow flow from the main diffuser 175, rather than trying to combine it with the fast flow.

To minimize disturbance to slow the upstream ends of the flow-dividing walls 174b, 176a and 176b are thickened and rounded: all these walls are designed so that flow reaches them at zero angle and that thereby they act at least at their upstream ends to divide flow rather than to divert it.

FIGURES 7 and 8 illustrate a "tangential" flow machine having a rotor 2 similar to that of FIGURE 1, with its parts similarly designated. The rotor 2 co-operates with guide means indicated generally at G and comprising end walls 200 extending perpendicularly to the rotor axis at either end of the rotor and, extending between the end walls, a guide body 201 providing a first guide wall 202, and a second guide wall 203 opposite thereto. The first guide wall 202 has a main guide portion 204 concave to the rotor, subtending a small angle at the rotor axis, and converging with the rotor in the direction of its rotation. At its line 204a of nearest approach to the rotor 2, where it is spaced therefrom by a distance about equal to the radial depth of a rotor blade 3, the main guide portion 204 merges with a lead-in wall portion 205 provided by the guide body 201. The first guide wall 202 further comprises an outlet wall portion 206 merging with the main guide portion 204 remote from the rotor in a rounded nose 207, the two portions 204, 206 of the first guide wall there defining approximately a right angle. The second guide wall 203 starts at a line 203a of nearest approach to the rotor 2, which is about diametrically opposite the line 204a of nearest approach of the wall portion 204, and similarly spaced from the rotor. The second guide wall 203 diverges steadily from the rotor 2 going in the direction of rotor rotation to a rectangular cross-section outlet 208 defined by the end walls 200, the outlet wall portion 206 and the second guide wall 203.

The guide means just described functions similarly to that of FIGURE 1, and a vortex of Rankine type is set up having a core region V adjacent the first guide wall 202. Flow is induced to pass twice through the path of the rotating blades 3 of the rotor from the suction region S to the pressure region P, as defined by the guide means, along lines indicated diagrammatically at F. For reasons explained in the foregoing discussion relating to FIGURES 1 to 6 (see especially FIGURE 4), and as will be seen from FIGURE 9, the velocity profile at the outlet 208 is strongly peaked adjacent the first guide wall 202, while the flow adjacent the second guide wall 203 is relatively slow. The static pressure in the region P is very low.

The machine illustrated in FIGURES 7 and 8 further includes a diffuser 209 having end walls 210, and first and second side walls 211, 212 defining an inlet 213 opposite the outlet 208 of the guide means G and spaced therefrom in the direction of flow, and an outlet 214. The diffuser 209 has a centre line 209a which is curved in the same sense as the direction of rotor rotation. The first side wall 211 of the diffuser 209 is generally aligned with and closely adjacent the termination of the first guide wall 202, so that the first flow adjacent that guide wall is guided with negligible loss into the diffuser. The second side wall 212 of the diffuser 209 is not aligned with, and is well spaced from the second guide wall 203, so as to define a gap 215 through which the slow flow adjacent second guide wall passes; the flow passing through the gap and thus rejected by the diffuser 209 is indicated by the hatched area in FIGURE 9. The end walls 200 of the guide means G are spaced from the end walls 210 of the diffuser 209, and the latter may be set somewhat inwardly of the former, so that end gaps 216 are formed through which escapes a proportion of the rotor throughout which has been slowed down by friction with the end walls 200 The gaps 216 get larger going towards the second guide wall 202 since the flow is slower near that wall, and more needs to be rejected by the diffuser. The diffuser end walls 210 merge with the side walls 211, 212 in rounded corners as seen in FIGURE 8, the corners at the second side wall 212 being more rounded than the others. Corner gaps are thus formed through which flow in the pressure region P, retarded in the corners of the guide means G, may pass. The diffuser 209 thus collects only the faster flow, while the slow flow is rejected through the gaps and recirculates through the rotor 2. The kinetic energy of the fast flow is partially converted to static pressure in the diffuser 209, and the conversion efficiency is not impaired by energy losses due to mixing between fast and slow flow. The fastest flow in the diffuser 209 is still adjacent the first side wall 211, and this is more strongly curved than the other wall 212 since the faster flow will be less inclined to separate.

Figure 10:
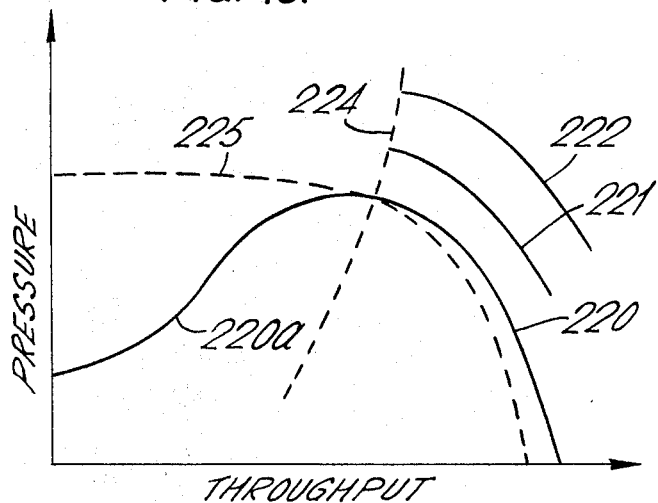
FIGURE 10 is a graph showing characteristic curves of the FIGURE 7 machine contrasted with curves typical of a tangential flow machine without recirculation.

FIGURE 10 illustrates characteristic curves, that is, static pressure plotted against throughput for a given fan and rotor speed. Curves 220, 221, 222 are characteristics of a simple "tangential" machine, run at successively increased speeds, where the whole of the rotor throughput is taken by a diffuser; such a construction would be exemplified by the FIGURE 7 construction if the guide means G merged into the diffuser 209 without any gap for rejection of the slow flow. Curve 220 is shown at 220a continuing towards the origin over the peak where the others stop. However this continuation is unstable and cannot be used in practice, so that, for the simple tangential machine the curve 223 represents a "boundary"; the machine cannot be used in the region to the left of this boundary. By contrast, as has been explained, the machine of FIGURES 7 and 8 uses only the fast flow for conversion to pressure energy and recirculates the slow flow. The characteristic for this machine is represented approximately by the curve 224; though the maximum throughput is slightly reduced, the machine can be throttled to zero throughput, or nearly, without instability.

This extension of the range of operation is advantageous generally, and quite apart from any increased pressore that results. However the extended range has particular advantage with multi-stage machines, as for example in the machine later described. A multi-stage machine comprising a series of simple "tangential" machines could operate over only a very narrow range of pressure and throughput, while with recirculation in each stage as described a much more flexible machine results, due to the improved characteristic curve of each stage.

Figure 10A:
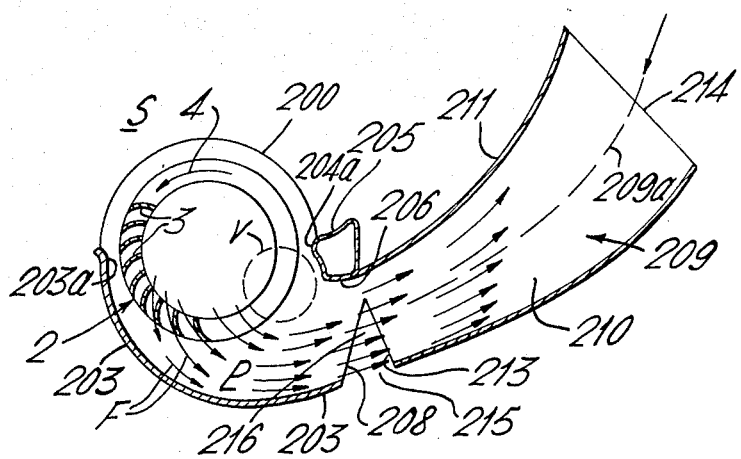
FIGURE 10a is a view similar to FIGURE 7 of a modification.

FIGURE 10a illustrates a modification of the FIGURE 7 construction; similar parts are given the same reference numerals. In this modification, the first guide wall 202 and the first diffuser side wall 211 are continuous, and the end walls 200 of the guide means G join the end walls 210 of the diffuser 209, leaving reduced end gaps 116. This construction functions similarly to of FIGURE 7.

FIGURES 11 and 12 illustrate a machine similar in many respects to that of FIGURES 7 and 8. Similar parts will be designated by the same reference numerals and they will need no further description. As in FIGURES 7 and 8, the diffuser 209 has its inlet 213 located at the outlet 208 of the guide means G: however, in this instance the diffuser inlet is positioned within the guide means outlet, so as to form a gap 230 in the form of a generally rectangular annulus through which slow speed flow from the pressure region P is rejected from the diffuser and recirculated. As will be seen, the gap 230 is similar in the region of the first guide wall 202 but larger, both at the ends and at the side adjacent the second guide wall 203.

A gap 230 is divided into a multiplicity of channels by divisions 230a extending parallel to flow in the pressure region. The divisions are arranged so that flow in the channels is laminar, whereby to reduce noise due to air escaping through the gap 230.

The machine of FIGURES 11 and 12 is provided with throttle means in the form of a flap 232 pivoted to the suction side of the first guide wall 202, the pivot axis 233 lying close to the line 204a of nearest approach to the guide wall to the rotor. When the flap 232 has the open position shown in full lines, the machine operates as explained with reference to FIGURES 7 and 8: this is the position for maximum throughput. If the flap 232 is moved adjacent the rotor 2 to the closed position as shown by the dotted lines, the throttle throughput drops, and the noise drops also. In this position the vortex core V becomes enlarged due to the deflection by flap 232 of air flow entering the rotor.

FIGURE 13 illustrates the effect of operating the flap 232. In this figure characteristic curves 234, 235, illustrating the relation of pressure to throughput, are shown for respective open and close positions of the flap 232. Curves 236, 237 show the relation of noise to throughput for respective open and close positions of the flap. As already mentioned, noise increases with throughput.

Referring now to FIGURES 14 to 16, the machine there shown once again comprises a rotor and guide means: parts similar to those of FIGURES 7 and 8 will be designated by the same numerals and will not require further description.

The second guide wall 203 is here formed in two parts 334, 335: the part 334 is pivotally mounted on pins 337 adjacent the line 203a of nearest approach of the wall 203 to the rotor 2 and the wall part 335 is pivotally mounted on pins 338 remote from the rotor. In the position of the wall parts 334, 335 shown in FIGURE 14 they meet at the point 339 about opposite the nose 207 and present a substantially continuous guide surface to flow in the passageway pressure region P. In this position of the wall parts faster and slower stream tubes pass undivided into the diffuser 339a defined between the outlet portion 206 of the first guide wall 202, and the part 335 of the second guide wall. The wall parts 334, 335 may however be pivoted to the positions shown in FIGURE 15 wherein they define a gap 340 through which in operation slower stream tubes pass into the ambient fluid for recirculation through the rotor, while faster stream tubes pass into the diffuser 339a. The gap 340 can be made smaller or larger depending on the degree to which the wall parts are pivoted from their FIGURE 14 position. Pivoting the wall part 335 also varies the angle of divergence of the diffuser 339a. It will be recalled that the fastest stream tubes run adjacent the vortex core V and that the peak of the velocity profile is situated towards the wall 202 adjacent which the vortex core forms. Thus the problem presented by the slower flow tubes is more acute adjacent the wall 203 where, in this embodiment, such tubes can be removed. It will be appreciated that, other things being equal, the faster the rotor rotates, the faster the flow as a whole; conversely the slower the speed of rotor rotation the more serious the problem of the slower flow tubes. It is therefore envisaged that the gap 340 may be closed at higher rotor speeds and opened when the rotor speed drops.

In addition to providing for discharge of slower stream tubes, the embodiment of FIGURES 14 to 16 provides also for removal of the boundary layer upon the wall of the guide wall part 335 and the end walls 200. Thus the wall part 335 is perforated with holes 345: pegs 346 are mounted in fixed position (by means not shown) to extend into and close the holes 345 when the wall part 335 adopts its FIGURE 14 position. In the dotted line position of the wall part 335 the holes 345 are open, so that the boundary layer adjacent the wall part 335 will tend to flow out through these holes into the ambient fluid. The guide wall part 335 is rigid with thin side cheeks 347 overlying the inner surfaces of the end walls 200. The side cheeks 347 are formed with slots 348 which, in the full line position of the guide wall part 335, are out of register with similar-shaped slots 349 in the end walls, but which curve increasingly into register with these latter slots as the part 335 is pivoted towards its FIGURE 15 position, thereby again allowing the boundary layer to escape. It will be appreciated that removal of the boundary layer assists in reducing separation losses in the diffuser 339a.

Figure 17:
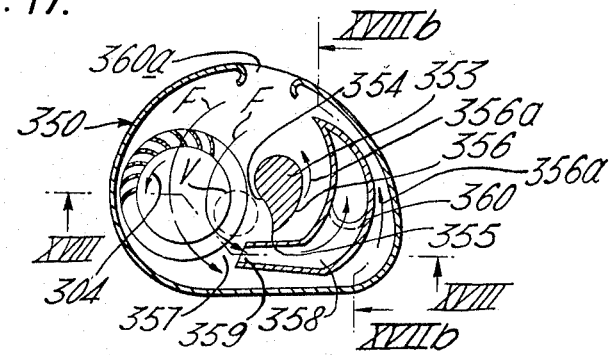
FIGURE 17 is a partial cross-sectional view of a multi-stage tangential flow machine employing recirculation in each stage.
Figure 18:
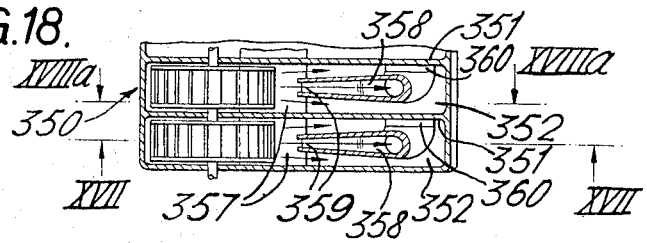
FIGURE 18 is a sectional view of the FIGURE 17 machine taken on the line XVIII—XVIII in FIGURE 17.

FIGURES 17 and 18 illustrate a multi-stage machine having similar stages with the rotors of the various stages aligned on a common axis; the first stage is shown in FIGURE 17 and the first two only in FIGURE 18.

A common casing 350, closed at its ends, has its interior subdivided by transverse partitions 351 to provide a series of similar chambers 352 each containing one stage. In each stage a rotor 2 is mounted for rotation about an axis which is common to the rotors of all stages: the rotor 2 occupies the whole width of the chamber 352 and lies adjacent the left-hand side of the casing 350, as seen in FIGURE 17. A guide body 353 at the right-hand side of the rotor 2 provides a first guide wall having a first portion 354 converging with the rotor (in the direction of rotation) from a line 355 where it meets at an acute angle a second guide wall portion 356 which curves round towards the rotor with gradually increasing curvature and finally rounds into the first guide wall portion at the point where it approaches nearest to the rotor. The lower left hand portion of the casing 350 (as seen in the drawing) provides the equivalent of the guide wall 203 of FIGURE 7, and defines with the guide body 353 an outlet 357 from the rotor 2. The rotor 2 and the guide means formed by the body 353 and the casing portion just referred to co-operate on rotor rotation to set up a vortex flow substantially as described with reference to FIGURES 1 to 6, the vortex core being again indicated at V and the flow lines at F.

A diffuser 358 is arranged with its inlet 359 at the outlet 357 from the rotor 2: the inlet has an area which in contrast to that of the diffuser 209 of FIGURE 2, is only a small fraction of the area of the outlet, and is located to receive the stream tubes of greatest velocity. All the throughput of the rotor except for these stream tubes is guided back to the suction region by the guide wall portion 356 and the part of the casing 350 which lies opposite to it, as shown by the arrows 356a. The diffuser 358 has its outlet end portion 360 bent round to discharge through a hole in the partition 351 into the suction region of the next stage.

Thus only the stream tubes of maximum kinetic energy are selected for partial conversion of this energy to static pressure and supply, at increased static pressure, to the next stage of the machine; the other stream tubes are recirculated through the rotor, with little loss of kinetic energy. For reasons which have been explained above, by having only high speed stream tubes in the diffuser the conversion to static pressure is improved, while the recirculation improves the stability of the machine on throttling.

For the first stage only, the casing 350 is provided with an inlet opening 360a.

The rotors are interconnected so that they can be driven by a common power source.

Figure 19:
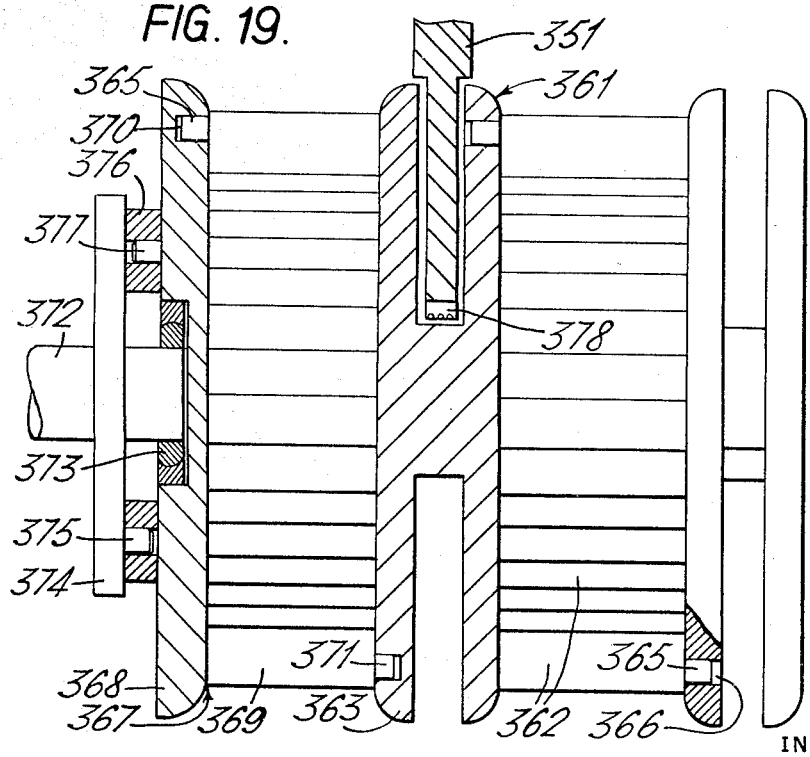
FIGURE 19 is a partial axial sectional view of a composite rotor and adjacent separating wall, such as may be used in the flow machine of FIGURES 17 and 18.
Figure 18A:
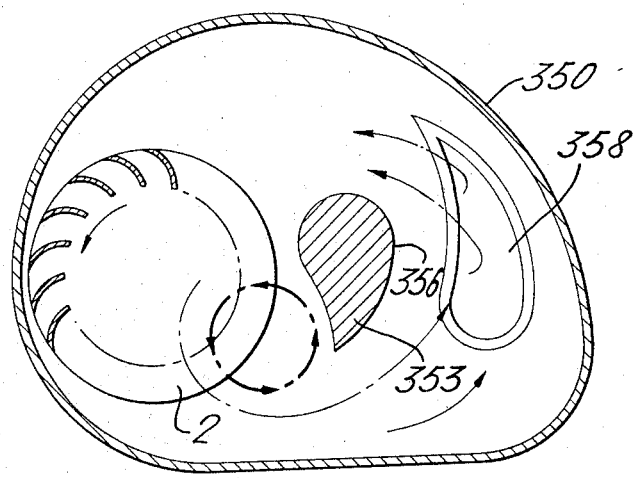
FIGURE 18a is a sectional view of the FIGURE 18 machine taken on the line XVIIIa—XVIIIa.
Figure 18B:
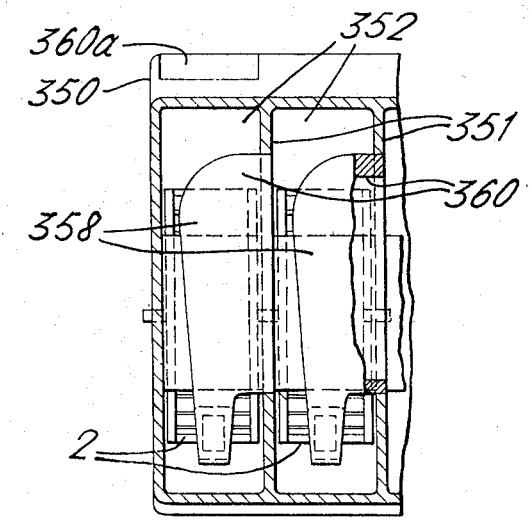
FIGURE 18b is a sectional view of the FIGURE 17 machine taken along line XXIIIb—XXIIIb.

FIGURE 19 illustrates a practical form of multiple rotor for use in a multi-stage machine such as just described. The multiple rotor comprises a series of identical components 361 of which one is shown in heavy outline and comprises a series of blades 362 projecting integrally to either side of a thick central disc 363 formed with a deep and narrow radially extending annular groove 364. The blades 362 terminate in spigots 365 and the disc 363 is formed on either face with complementary recesses 366, one between each pair of adjacent blades. The multiple rotor is assembled by fitting the spigots 365 of one component into the recesses 366 of the next component: thus the blades of any particular rotor belong alternately to one component and to its neighbour. End components, such as the component 367, are provided comprising an ungrooved disc 368 and blades 369 extending therefrom and alternating with the blades 362 of the adjacent component, the spigots 365 on the latter being received in recesses 370 in the disc 369 and spigots 371 on the blades 369 being received in the adjacent recesses 366 of the component 361. A shaft 372 supports one end of the multiple rotor by means of a self-aligning bearing 373 received in an axial recess in the end disc 368 with the opposite end being supported by a conventional stub shaft being positioned in fixed bearings, not shown. A disc 374 mounted on the shaft 372 carries studs 375 engaging in holes in an elastic ring 376: studs 377 project from the end disc 368 intermediate the studs 375 and engage in further holes in the ring 376. This arrangement provides a flexible drive connection between the shaft 372 and the multiple rotor. Thus the shaft 372 can both support one end of, and drive, the multiple rotor despite minor misalignment between the axes of the rotor and of the shaft.

The partitions 351 extend with clearance into the grooves 364: they terminate in soft arcuate pads 378 acting as packing.

As will be appreciated, various modifications may be made in the embodiments described herein without departing from the scope of the invention. For example, in FIGURE 7 or FIGURE 10a, the diffuser 209 may be subdivided by a guide wall intermediate the walls 211 and 212 and running parallel to the streamlines: the intermediate wall might for example run along the centre line 209a. The various walls would then form two separate diffusers receiving flow from the pressure region adjacent the guide body 201 and rejecting flow adjacent the second guide wall 203. The flow in the two diffusers could be used separately. Several intermediate guide walls could be provided in the diffuser 209, making in effect several diffusers, much as in FIGURE 1. In the FIGURE 1 arrangement flow in diffusing channels 177, 178 can be collected, separately or together, and flow in channel 179 rejected or recirculated. Various features from the different embodiments can be combined.

I claim:

1. A fluid flow machine comprising a cylindrical bladed rotor mounted for rotation about its axis in a predetermined direction and defining an interior space, guide means defining with the rotor a suction region and a discharge pressure region, the guide means and rotor co-operating on rotation of the latter in said predetermined direction to set up a vortex having a velocity distribution approximately as in a Rankine vortex with a core region eccentric of the rotor axis and a field region which guides fluid from the suction region through the path of the rotating blades of the rotor to the interior of the rotor and thence again through the path of the rotating blades of the rotor to the discharge pressure region, a diffuser having an intake of smaller cross-sectional area than the cross-sectional area of said discharge pressure region and being located in said discharge pressure region, and means positioning said intake to communicate only with flow from the field region adjacent the vortex core whereby flow from the field region remote from the vortex core is bypassed by said diffuser.

2. A machine as claimed in claim 1, wherein the discharge pressure region extends over an arc of the rotor which is a major part of 180° and the diffuser collects fluid from a fraction only of said arc.

3. A machine as claimed in claim 1, wherein flow bypassed by the diffuser is recirculated through the rotor.

4. A machine as claimed in claim 1, further comprising means to collect flow bypassed by said diffuser and to lead the same to a separate outlet.

5. A fluid flow machine comprising a cylindrical bladed rotor mounted for rotation about its axis in a predetermined direction and defining an interior space, guide means defining with the rotor a suction region and a pressure region, the guide means including a guide body extending the length of the rotor in spaced relation thereto and subtending a small angle at the rotor axis, said guide body separating the pressure region from the suction region going in the direction of rotation, the guide means and rotor co-operating on rotation of the latter in said predetermined direction to set up a vortex of Rankine character having a core region eccentric of the motor axis adjacent said guide body and a field region which guides fluid from the suction region through the path of the rotating blades of the rotor to the interior of the rotor and thence again through the path of the rotating blades of the rotor to the pressure region, and a diffuser having a first wall substantially continuous with the guide body on the side thereof in said pressure region and extending away from the rotor and a second wall also extending away from the rotor the second wall having its leading edge spaced from the guide body and dividing flow within the pressure region, flow therein adjacent the guide body entering the diffuser and flow in the pressure region remote from the guide body being rejected by the diffuser.

6. A machine as claimed in claim 5, wherein the first diffuser wall merges into and is continuous with said guide body.

7. A machine as claimed in claim 5, wherein the first diffuser wall is spaced from the guide body.

8. A fluid flow machine comprising a cylindrical bladed rotor mounted for rotation about its axis in a predetermined direction and defining an interior space, guide means comprising end walls and first and second guide walls extending between the end walls along the length of the rotor and away therefrom and defining with the rotor a suction region and a pressure region the first wall separating the pressure region from the suction region going in the direction of rotation said guide walls co-operating with the rotor on rotation thereof in said predetermined direction to set up a vortex of Rankine character having a core region eccentric of the rotor axis and adjacent the first guide wall and a field region which guides fluid from the suction region through the path of the rotating blades of the rotor to the interior of the rotor and thence again through the path of the rotating blades of the rotor to the pressure region, and a diffuser comprising said first guide wall and a third guide wall intermediate the first and second guide walls, the third wall dividing flow within the pressure region flow therein adjacent the first guide wall entering the diffuser and flow in the pressure region adjacent the second wall being rejected by the diffuser.

9. A machine as claimed in claim 8, wherein the third wall is nearer the first wall than the second wall.

10. A machine as claimed in claim 8, wherein the second and third guide walls form a second diffuser collecting flow rejected from the first mentioned diffuser and leading said flow to a separate outlet.

11. A fluid flow machine comprising a cylindrical bladed rotor mounted for rotation about its axis in a predetermined direction and defining an interior space, guide means comprising end walls and first and second guide walls extending between the end walls along the length of the rotor and away therefrom and defining with the rotor a suction region and a pressure region the first wall separating the pressure region from the suction region going in the direction of rotation said guide walls co-operating with the rotor on rotation thereof in said predetermined direction to set up a vortex of Rankine character having a core region eccentric of the rotor axis and adjacent the first guide wall and a field region which guides fluid from the suction region through the path of the rotating blades of the rotor to the interior of the rotor and thence again through the path of the rotating blades of the rotor to the pressure region, and a diffuser having first and second side walls and end walls and being located to receive fluid from said pressure region with flow adjacent the first guide wall entering the diffuser adjacent the first side wall thereof, the second diffuser side wall and said second guide wall defining a gap for escape from the diffuser of the flow adjacent the second guide wall.

12. A machine as claimed in claim 11, wherein the diffuser end walls are located inwardly of the first-mentioned end walls to define gaps for escape from the diffuser of the flow adjacent the first-mentioned end walls.

13. A machine as claimed in claim 11, wherein said diffuser end walls and side walls merge in rounded corners.

14. A machine as claimed in claim 11, wherein said diffuser has a centre line which is curved in the same sense as said predetermined direction of rotation.

15. A fluid flow machine comprising a cylindrical bladed rotor mounted for rotation about its axis in a predetermined direction and defining an interior space, guide means comprising end walls and first and second guide walls extending between the end walls along the length of the rotor and away therefrom and defining with the rotor a suction region and a pressure region the first wall separating the pressure region from the suction region going in the direction of rotation said guide walls co-operating with the rotor on rotation thereof in said predetermined direction to set up a vortex of Rankine character having a core region eccentric of the rotor axis and adjacent the first guide wall and a field region which guides fluid from the suction region through the path of the rotating blades of the rotor to the interior of the rotor and thence again through the path of the rotating blades of the rotor to the pressure region, said guide means defining an outlet through which the whole of the rotor throughput passes and a diffuser having its inlet adjacent said outlet to receive fluid therefrom with said inlet having its cross-sectional area less than the cross-sectional area of said outlet and wherein said inlet is positioned to receive flow passing adjacent said vortex and to bypass flow through said outlet adjacent one of said walls.

16. A machine as claimed in claim 15, the diffuser inlet being spaced from the guide means and in the directions of fluid flow.

17. A machine as claimed in claim 15, the diffuser inlet lying within the outlet of the guide means to define a gap in the form of a substantially rectangular annulus.

18. A machine as claimed in claim 17 including means dividing flow in said gap whereby to render said flow laminar.

19. A machine as claimed in claim 15, wherein throttle means are mounted on the first guide wall and movable between a retracted position against said guide wall and an operative position overlying an arc of the rotor adjacent the guide wall on the suction region side thereof.

20. A fluid flow machine comprising a cylindrical bladed rotor mounted for rotation about its axis in a predetermined direction and defining an interior space guide means comprising end walls and first and second guide walls extending between the end walls along the length of the rotor and away therefrom and defining with the rotor a suction region and a pressure region the first wall separating the pressure region from the suction region going in the direction of rotation said guide walls co-operating with the rotor on rotation thereof in said predetermined direction to set up a vortex of Rankine character having a core region eccentric of the rotor axis and adjacent the first guide wall and a field region which guides fluid from the suction region through the path of the rotating blades of the rotor to the interior of the rotor and thence again through the path of the rotating blades of the rotor to the pressure region, the second wall having at least a portion defining with the first wall a diffuser said second wall portion being pivotally mounted remote from the rotor about an axis parallel thereto for movement to vary the proportion of the rotor throughput accepted by the diffuser and also the divergence of the diffuser.

21. A machine as claimed in claim 20, wherein the side walls comprise fixed portions and movable portions, the movable portions being slidable over said fixed portions between a first position in which said fixed and movable portions define substantially imperforate end boundaries of said diffuser and a second position in which said fixed and movable portions define openings for endwise escape of boundary layer fluid from the diffuser.

22. A machine as claimed in claim 21, wherein the movable second wall portion and the movable end wall portions form a unit.

23. A machine as claimed in claim 5, wherein said second wall is movable with its leading edge always parallel to the rotor axis to vary the proportion of flow in the pressure region which enters the diffuser.

24. A fluid flow machine comprising a cylindrical bladed rotor mounted for rotation about its axis in a predetermined direction and defining an interior space, guide means comprising end walls and first and second guide walls extending between the end walls along the length of the rotor and away therefrom and defining with the rotor a suction region and a pressure region the first wall separating the pressure region from the suction region going in the direction of rotation said guide walls co-operating with the rotor on rotation thereof in said predetermined direction to set up a vortex of Rankine character having a core region eccentric of the rotor axis and adjacent the first guide wall and a field region which guides fluid from the suction region through the path of the rotating blades of the rotor to the interior of the rotor and thence again through the path of the rotating blades of the rotor to the pressure region, the second wall including a first portion adjacent the rotor and diverging therefrom and a second portion remote from the rotor and defining with the first wall a diffuser, at least one of said portions being pivotally movable about an axis parallel to the rotor axis between a first position wherein the first and second portions are aligned to form a smooth curve and a second position wherein the first and second portions are out of alignment to define a gap for flow therethrough of fluid from adjacent the first wall portions to the outside of the diffuser.

25. A machine as claimed in claim 24, wherein the first portion of the second wall is pivotally mounted adjacent the rotor and the second portion of the second wall is pivotally mounted remote from the rotor.

26. A fluid flow machine comprising a plurality of stages each comprising a cylindrical bladed rotor mounted for rotation about its axis in a predetermined direction and defining an interior space, guide means defining with the rotor a suction region and a pressure region, the guide means and rotor co-operating on rotation of the latter in said predetermined direction to set up a vortex of Rankine character having a core region eccentric of the rotor axis and a field region which guides fluid from the suction region through the path of the rotating blades of the rotor to the interior of the rotor and thence again through the path of the rotating blades of the rotor to the pressure region, a diffuser between each pair of adjacent stages, each diffuser having an inlet located in the pressure region of one stage and being of smaller cross-sectional area than the pressure region in which it is positioned, means positioning said diffuser to receive flow from the field region thereof adjacent the vortex core and to deliver said flow at enhanced pressure to the suction region of the next stage, and means in each stage to circulate to the suction region thereof flow in the pressure region of that stage which is bypassed by the diffuser.

27. A machine as claimed in claim 26 wherein all said stages are coaxial and the rotors thereof are coaxial and driven as a unit.

28. A fluid flow machine comprising a cylindrical bladed rotor mounted for rotation about its axis in a predetermined direction and defining an interior space, guide means defining with the rotor a suction region and a pressure region, the guide means and rotor co-operating on rotation of the latter in said predetermined direction to set up a vortex having a velocity distribution approximately as in a Rankine vortex with a core region eccentric of the rotor axis and a field region which guides fluid from the suction region through the path of the rotating blades of the rotor to the interior of the rotor and thence again through the path of the rotating blades of the rotor to the pressure region, and at least two diffusers having inlets in said pressure region to receive flow in said field region, one of said diffusers receiving flow from adjacent the vortex core.

29. A machine as claimed in claim 28, wherein said diffusers reject flow from the field region remote from the vortex core.

30. A fluid flow machine comprising a cylindrical bladed rotor mounted for rotation about its axis in a predetermined direction and defining an interior space, guide means comprising end walls and first and second guide walls extending between the end walls along the length of the rotor and away therefrom and defining with the rotor a suction region and a pressure region the first wall separating the pressure region from the suction region going in the direction of rotation said guide walls co-operating with the rotor on rotation thereof in said predetermined direction to set up a vortex of Rankine character having a core region eccentric of the rotor axis and adjacent the first guide wall and a field region which guides fluid from the suction region through the path of the rotating blades of the rotor to the interior of the rotor and thence again through the path of the rotating blades of the rotor to the pressure region, and at least one guide wall intermediate the first and second guide walls and dividing flow in said pressure region said guide walls defining a plurality of diffusers receiving flow in said pressure region adjacent the first guide wall flow in the pressure region adjacent the second wall being rejected by the diffusers.

References Cited by the Examiner
UNITED STATES PATENTS 2,942,773   6/1960   Eck _____ 230—125

MARK NEWMAN, *Primary Examiner.*
HENRY F. RADUAZO, *Examiner.*